I. T. MARKS.
NUT LOCK.
APPLICATION FILED MAR. 22, 1919.
1,320,161. Patented Oct. 28, 1919.
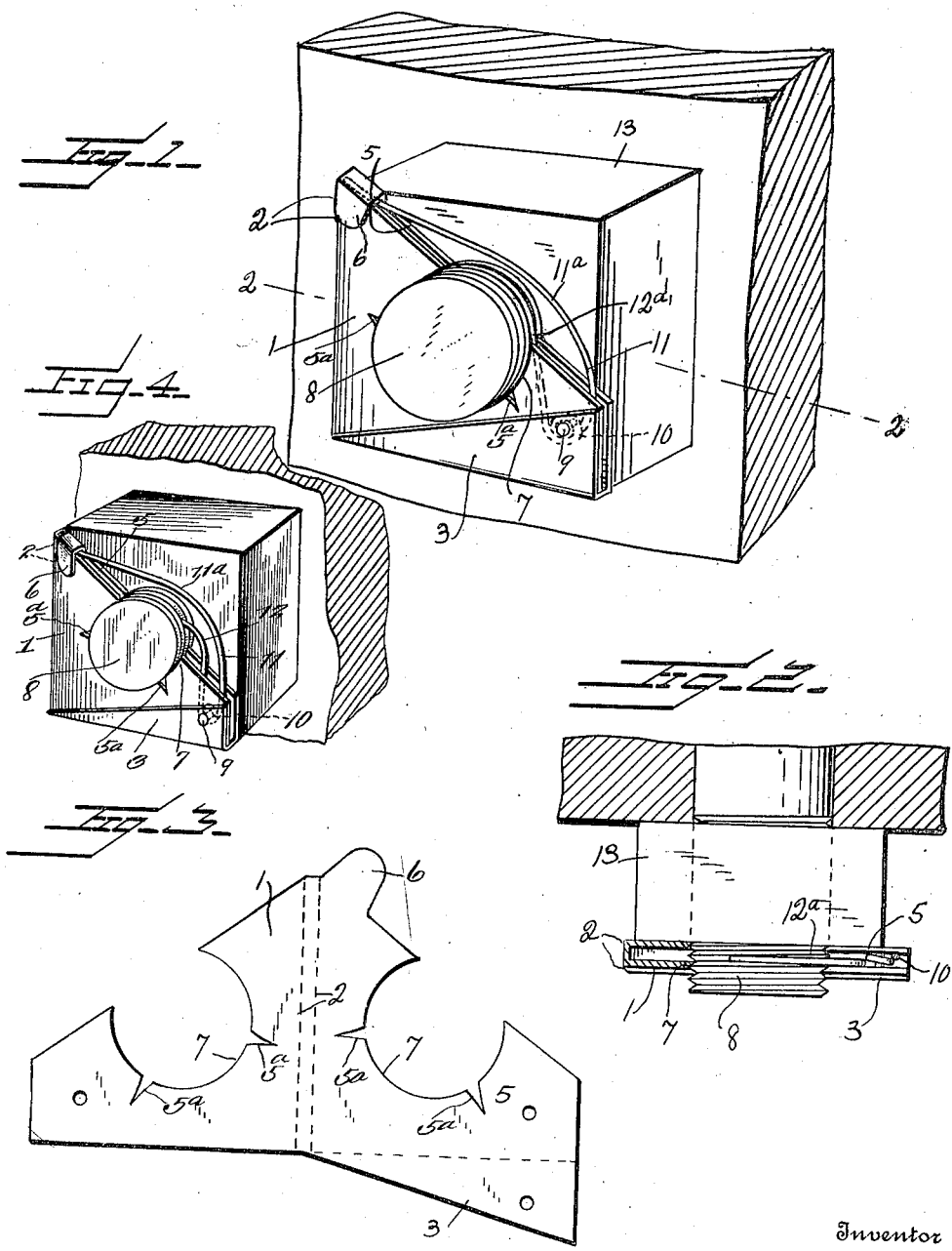
Inventor
I. T. Marks
By Watson E. Coleman
Attorney

UNITED STATES PATENT OFFICE.

ISAAC T. MARKS, OF DIVIDE, WEST VIRGINIA.

NUT-LOCK.

1,320,161. Specification of Letters Patent. Patented Oct. 28, 1919.

Application filed March 22, 1919. Serial No. 284,434.

*To all whom it may concern:*

Be it known that I, ISAAC T. MARKS, a citizen of the United States, residing at Divide, in the county of Fayette and State of West Virginia, have invented certain new and useful Improvements in Nut-Locks, of which the following is a specification, reference being had to the accompanying drawings.

This invention relates to an improved nut lock, and an object of the invention is to provide a device of this kind for locking nuts on bolts, that is to prevent the nut from gradually becoming unscrewed.

The invention further aims to provide an improved nut lock, which is simple, efficient and practical in construction, and in which novel features are involved.

One of the features of the invention is the construction of the main body of the nut locking device from a single piece of sheet metal bent upon itself to form a triangular shaped member, the opposite sides of which being spaced, and the sides nearest the adjacent edges being cutaway or provided with semi-circular portions to engage the shank of the bolt, between the nut on the bolt and the member to be clamped.

Another feature of the invention is the provision of means for spacing the opposite portions of the sheet metal plate, after being bent to form a triangular body, and means between the opposite sides of the plate to be moved and having means yieldably urging into engagement with the threads of the bolt, thereby preventing the nut from unscrewing.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a view in perspective of the improved nut lock constructed in accordance with the invention and showing the same applied to a bolt.

Fig. 2 is a sectional view on line 2—2 of Fig. 1.

Fig. 3 is a detail plan view of the blank, from which the nut lock is constructed.

Fig. 4 is a perspective view of the improved nut lock, as applied to a nut, showing slight modifications.

Referring more especially to the drawings 1 designates a nut locking device as a whole, and which is constructed from a single piece of sheet metal, which may be of any suitable shape or configuration, preferably as shown in Fig. 3. However, it is to be noted that the sheet metal blank in Fig. 3 is so shaped, that when it is folded upon itself on the scored lines 2, a substantially triangular shaped body is constructed. This body is provided with opposed sides, one of which is supplied with a triangular tongue 3 overlying the opposite sides, assisting materially in holding the two sides spaced. The side portion 5 (which carries the tongue 3) of the body on one edge thereof is provided with a short lug 6, which also overlies the opposite side of the body, to additionally assist in holding the sides equally spaced. The opposite sides of the body adjacent their diagonal edges have substantially circular cutaway portions 7, which correspond in diameter and are designed to receive the shank 8 of the bolt. A rivet or pin passes between the two sides of the body, and also through the tongue 3, not only secures the tongue and the two sides together, but also constitutes a support for a spring member. Mounted upon the pin or rivet 9 are the several coils 10 of the spring device 11. This spring device comprises the coils, and the long and short arms 11ª and 12.

The substantially circular cutaway portions 7 are of such characters, in fact of such diameters on their edges, that they are designed to bite into the threads of the shank, thereby enabling the nut locking device to be turned home in close contact with the nut 13. After connecting the body of the nut locking device to the shank of the bolt, so that the edges of the cutaway portions 7 may bite into the threads and the body is turned home toward and in contact with the face of the nut, the short arm 12 (which is curved eccentric with the shank of the bolt and of a length substantially equal to a quarter segment of the cylindrical contour of the shank of the bolt) of the spring device is arranged in engagement with a thread of the shank of the bolt. This arm 12 is arcuately curved, and the edges (which are diametrically opposite the arcuately curved arm 12) of the cutaway portions 7 are drawn in biting engagement with the thread of the shank of the bolt, thereby holding the body of the nut locking device securely on the shank enabling it to be turned completely home in contact with the face of the nut. The spring arm 11ª is designed to be positioned so that its end portion will engage under the lug 6 as shown in Fig. 1, thereby creating considerable spring tension and urging the short arm 12 firmly in contact with the thread of the shank of the bolt.

It is to be noted that in Fig. 4 the short spring arm 12 has its end portion engaging the threads of the bolt shank, instead of the arm 12ª conforming to and engaging the threads, that is for the full length of the curvature of said arm, as illustrated in Fig. 1. Also in Fig. 4 the lug 6 is formed in a position on the plate forming the nut locking device, nearer the openings or cutaway portions 7, so that when the sheet metal plate is bent to form the nut locking device, the lug 6 will not be adjacent the extreme end of the folds 2 of the plate. It is to be noted that the sheet metal plate forming the nut locking device is provided with a plurality of V-shaped notches 5ª adjacent the marginal edges of the opening or cutaway portions 7. It is obvious that any number of V-shaped notches 5ª may be employed. If desired, only one adjacent each opening or cutaway portion may be employed, or two or three may be used. It is also to be noted that these notches are not uniformly arranged, that is they are not arranged so as to register when the plate is folded upon the scored lines 2. These notches 5ª are provided for the purpose of permitting the marginal edge portions of the opening or cutaway portion between the notches 5ª to be bent laterally or deflected, so as to conform to the spiral arrangement of the thread of the shank of the bolt, so that the nut locking device may be applied to the shank. In other words, the portions between the notches are bent and inclined to uniformly conform to the spiral arrangement of the thread. By such a construction, the face of the nut locking device will be held flat against the outer face of the nut.

The invention having been set forth, what is claimed as new and useful is:

1. A nut lock, comprising a sheet metal body, bent upon itself to form a triangular shaped body member having opposite sides, the opposite sides of the body member adjacent one of their edges having bolt shank engaging cutaway portions, and an element between the two sides of the body and having a spring arm yieldably urging pressure toward the shank of the bolt, and means for creating yieldable pressure for the arm to hold it in contact with the shank of the bolt.

2. In a nut lock, the combination with a body, having opposed spaced sides, said sides having bolt shank engaging means, a member pivoted between the sides and having yieldable means urging yieldable pressure on the shank, and means engaging a part of the body for creating the yieldable pressure for the yieldable means to hold it in engagement with the shank.

3. In a nut lock, the combination with a body having semi-circular cutaway portions to engage the shank of the bolt, said body having opposed sides, a spring wire member having coils pivoted between the sides of the body and provided with a yieldable arm yieldably engaging and urging pressure on the shank of the bolt, said member having means to be locked in engagement with the body, for creating yieldable pressure.

4. In a nut lock, the combination with a body having semi-circular cutaway portions to engage the shank of the bolt, said body having opposed sides, a spring wire member having coils pivoted between the sides of the body and provided with a yieldable arm yieldably engaging and urging pressure on the shank of the bolt, said member having means to be locked in engagement with the body, for creating yieldable pressure, said body being constructed from a single piece of sheet metal bent upon itself to form opposed sides, and means for holding the spaced sides in their relative position.

5. In a nut lock, the combination with a body having semi-circular cutaway portions to engage the shank of the bolt, said body having opposed sides, and a spring wire member having means pivoted between the sides of the body and provided with a yieldable arm yieldably engaging and urging pressure on the shank of the bolt.

6. In a nut lock, the combination with a body having semi-circular cutaway portions to engage the shank of the bolt, said body having opposed sides, a spring wire member having coils pivoted between the sides of the body, said spring wire member having a short arcuately curved arm engaging the thread of the shank of the bolt diametrically opposite the semi-circular cutaway portions, and means carried by the spring wire member and coöperating with a part of said body for creating a constant pressure along the arcuately curved arm, whereby it is urged toward and in contact with the threads of the shank to retain the cutaway portions in biting engagement with the thread of the shank.

7. In a nut lock, the combination with a body having semi-circular cutaway portions to engage the shank of the bolt, said body having opposed sides, a spring wire member having coils pivoted between the sides of the body, said spring wire member having a short arcuately curved arm engaging the thread of the shank of the bolt diametrically opposite the semi-circular cutaway portions, said body having a retaining lug, said spring member having spring coils and a long spring arm engaging under said retaining lug, which spring action of said coil creates yieldable pressure along the arcuately curved arm, whereby the edges of the cutaway portions diametrically opposite the arcuately curved arm are drawn into biting engagement with the thread of the shank of the bolt.

In testimony whereof I hereunto affix my signature.

ISAAC T. MARKS.

Copies of this patent may be obtained for five cents each, by addressing the "Commissioner of Patents, Washington, D. C."